(12) United States Patent
Barbu et al.

(10) Patent No.: US 12,578,415 B2
(45) Date of Patent: Mar. 17, 2026

(54) LOS TRAINING DATASET IMBALANCE DETECTION

(71) Applicant: Nokia Technologies Oy, Espoo (FI)

(72) Inventors: Oana-Elena Barbu, Aalborg (DK); Zexian Li, Espoo (FI); István Zsolt Kovács, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 431 days.

(21) Appl. No.: 18/040,330

(22) PCT Filed: Aug. 4, 2021

(86) PCT No.: PCT/EP2021/071757
§ 371 (c)(1),
(2) Date: Feb. 2, 2023

(87) PCT Pub. No.: WO2022/037943
PCT Pub. Date: Feb. 24, 2022

(65) Prior Publication Data
US 2023/0266426 A1 Aug. 24, 2023

(30) Foreign Application Priority Data
Aug. 17, 2020 (EP) ..................................... 20191241

(51) Int. Cl.
*G01S 5/02* (2010.01)
*G06N 20/00* (2019.01)

(52) U.S. Cl.
CPC ............ *G01S 5/0218* (2020.05); *G06N 20/00* (2019.01)

(58) Field of Classification Search
CPC ............................... G01S 5/0218; G06N 20/00
See application file for complete search history.

(56) References Cited

U.S. PATENT DOCUMENTS

| | | | |
|---|---|---|---|
| 9,720,069 B2 | 8/2017 | Lim et al. | |
| 11,451,260 B2* | 9/2022 | Scholand | ............... H04B 1/715 |

(Continued)

FOREIGN PATENT DOCUMENTS

| | | |
|---|---|---|
| CN | 108769969 A | 11/2018 |
| CN | 110261818 A | 9/2019 |

(Continued)

OTHER PUBLICATIONS

Office Action received for corresponding Japanese Patent Application No. 2023-512069, dated May 23, 2024, 3 pages of Office Action and 4 pages of summary and translation available.

(Continued)

*Primary Examiner* — Vladimir Magloire
*Assistant Examiner* — Kimberly Jenkins
(74) *Attorney, Agent, or Firm* — Lippes Mathias LLP

(57) ABSTRACT

There is provided a method for a UE of a wireless communication system, the method comprising: detecting an imbalance in a line-of-sight, LOS, training dataset for training a LOS detector; determining a minority class of the LOS training dataset associated with the detected imbalance; transmitting, to a network element of the wireless communication system, a request message indicating the determined minority class and requesting measurement activation to perform one or more measurements, by the UE, to obtain one or more additional signal samples for the minority class; and receiving, from the network element, an activation message causing the UE to perform the one or more measurements during a configured observation window.

12 Claims, 9 Drawing Sheets

(56) References Cited

U.S. PATENT DOCUMENTS

| | | | | |
|---|---|---|---|---|
| 12,279,120 | B2 * | 4/2025 | Da Silva | H04W 12/122 |
| 2013/0271324 | A1 | 10/2013 | Sendonaris et al. | |
| 2015/0055459 | A1 * | 2/2015 | Wong | H04W 8/04 |
| | | | | 370/235 |
| 2015/0356464 | A1 * | 12/2015 | Lin | G06N 20/00 |
| | | | | 706/12 |
| 2017/0170940 | A1 * | 6/2017 | Lee | H04W 72/0446 |
| 2018/0123837 | A1 * | 5/2018 | Barbu | H04L 25/03987 |
| 2018/0210944 | A1 | 7/2018 | Sukhanov et al. | |
| 2020/0097690 | A1 | 3/2020 | Wan et al. | |
| 2020/0120482 | A1 | 4/2020 | Parkvall et al. | |
| 2020/0177259 | A1 | 6/2020 | Zu et al. | |
| 2020/0177266 | A1 | 6/2020 | Kang et al. | |
| 2020/0275291 | A1 * | 8/2020 | Moisio | G01S 19/46 |
| 2021/0001981 | A1 * | 1/2021 | Ihalainen | G01S 19/03 |
| 2021/0073671 | A1 * | 3/2021 | Puri | G06N 5/04 |
| 2022/0038931 | A1 * | 2/2022 | Kuru | H04L 1/0026 |
| 2022/0312354 | A1 * | 9/2022 | Teyeb | H04B 7/06952 |
| 2023/0156658 | A1 * | 5/2023 | Barbu | H04W 64/003 |
| | | | | 455/456.1 |

FOREIGN PATENT DOCUMENTS

| | | |
|---|---|---|
| EP | 2015103 A1 | 1/2009 |
| JP | 2010-534423 A | 11/2010 |
| JP | 2015-523545 A | 8/2015 |
| WO | 2021/204351 A1 | 10/2021 |
| WO | 2021/213685 A1 | 10/2021 |
| WO | 2021/249634 A1 | 12/2021 |

OTHER PUBLICATIONS

"3rd Generation Partnership Project; Technical Specification Group Radio Access Network; NR; Physical layer procedures for data (Release 16)", 3GPP TS 38.214, V16.1.0, Mar. 2020, pp. 1-151.

"3rd Generation Partnership Project; Technical Specification Group Radio Access Network; Study on channel model for frequencies from 0.5 to 100 GHz (Release 16)", 3GPP TR 38.901, V16.1.0, Dec. 2019, pp. 1-101.

"Initial views on potential positioning enhancements", 3GPP TSG RAN WG1 #101-e, R1-2003721, Agenda: 8.2.3, Nokia, May 2020, 4 pages.

"Why it is important to work with a balanced classification dataset", amsantac.co, Retrieved on Mar. 1, 2023, Webpage available at : http://amsantac.co/blog/en/2016/09/20/balanced-image-classification-r.html.

Huang et al., "Machine Learning-Enabled LOS/NLOS Identification for MIMO Systems in Dynamic Environments", IEEE Transactions on Wireless Communications, vol. 19, No. 6, Jun. 2020, pp. 3643-3657.

Bombino et al., "Machine Learning-Aided Classification Of LoS/NLoS Radio Links In Industrial IoT", 16th IEEE International Conference on Factory Communication Systems (WFCS), Apr. 27-29, 2020, 8 pages.

Extended European Search Report received for corresponding European Patent Application No. 20191241.7, dated Feb. 2, 2021, 9 pages.

Hsu, "GNSS multipath detection using a machine learning approach", IEEE 20th International Conference on Intelligent Transportation Systems (ITSC), Oct. 16-19, 2017, 6 pages.

Tallo et al., "The Implementation of Genetic Algorithm in Smote (Synthetic Minority Oversampling Technique) for Handling Imbalanced Dataset Problem", 4th International Conference on Science and Technology (ICST), Aug. 7-8, 2018, 4 pages.

International Search Report and Written Opinion received for corresponding Patent Cooperation Treaty Application No. PCT/EP2021/071757, dated Nov. 24, 2021, 12 pages.

"Other aspects on AI/ML for positioning accuracy enhancement", 3GPP TSG RAN WG1 #109, R1-2204576, Agenda: 9.2.4.2, Nokia, May 9-20, 2022, 7 pages.

Notice of Allowance received for corresponding European Patent Application No. 20191241.7, dated Apr. 19, 2024, 8 pages.

Office action received for corresponding Indian Patent Application No. 202347016548, dated Jul. 21, 2023, 5 pages.

Office Action received for corresponding Chinese Patent Application No. 202180050649.2, dated Jun. 29, 2025, 10 pages of Office Action and no page of translation available.

Miao et al., "Class Imbalance Learning for Identifying NLOS in UWB Positioning", Journal of Signal Processing, vol. 32, No. 01, Jan. 2016, pp. 8-13.

Song et al., "NLOS Identification Approach in UWB Positioning Based on Class—Imbalance Classification", Journal of Information Engineering University, vol. 20, No. 02, Apr. 2019, pp. 147-153.

Miao et al., "Application of One-Class Classification in NLOS Identification of UWB Positioning", International Conference on Information System and Artificial Intelligence, Jun. 24-26, 2016, pp. 318-322.

* cited by examiner

<u>202:</u> DETECTING IMBALANCE IN LOS TRAINING DATASET

<u>204:</u> DETERMINING MINORITY CLASS ASSOCIATED WITH IMBALANCE

<u>206:</u> TRANSMITTING REQUEST MESSAGE INDICATING MINORITY CLASS AND REQUESTING MEASUREMENT ACTIVATION TO PERFORM MEASUREMENT(S) TO OBTAIN ADDITIONAL SIGNAL SAMPLE(S) FOR MINORITY CLASS

<u>208:</u> RECEIVING ACTIVATION MESSAGE CAUSING UE TO PERFORM MEASUREMENT(S) DURING CONFIGURED OBSERVATION WINDOW

Fig. 2

<u>302:</u> RECEIVING REQUEST MESSAGE INDICATING MINORITY CLASS ASSOCIATED WITH IMBALANCED LOS TRAINING DATASET AND REQUESTING MEASUREMENT ACTIVATION TO PERFORM MEARUREMENT(S), BY UE, TO OBTAIN ADDITIONAL SIGNAL SAMPLE(S) FOR MINORITY CLASS

<u>304:</u> TRANSMITTING ACTIVATION MESSAGE CAUSING UE TO PERFORM MEASUREMENT(S) DURING CONFIGURED OBSERVATION WINDOW

Fig. 3

600: OBSERVATION WINDOW CONFIGURATION INFORMATION

602: DURATION, Tc

604: START TIME, T_start

610: REQUEST MESSAGE

612: MINORITY CLASS

614: SEVERITY INDICATOR

616: IMBALANCE RATIO

618: MOBILITY DATA

620: ACTIVATION MESSAGE

622: ACK/NACK

LOS TRAINING DATASET IMBALANCE DETECTION

RELATED APPLICATION

This application claims priority to PCT Application No. PCT/EP2021/071757, filed on Aug. 4, 2021, which claims priority from EP Application No. 20191241.7, filed on Aug. 17, 2020, each of which is incorporated herein by reference in its entirety.

TECHNICAL FIELD

The invention relates to communications.

BACKGROUND

User equipment, UE, may measure and report a metric called time-of-arrival (TOA) to a wireless communication network. TOA may be utilized in computing distance between the UE and a network node, such as a base station. However, if TOA is measured incorrectly, the distance may in turn be miscomputed. Hence, it may be beneficial to provide further solutions that target enhancing accuracy of TOA measurement.

BRIEF DESCRIPTION

According to an aspect, there is provided the subject matter of the independent claims.

According to an aspect, there is provided an apparatus comprising means for performing: detecting, by a user equipment, UE, of a wireless communication system, an imbalance in a line-of-sight, LOS, training dataset for training a LOS detector; determining a minority class of the LOS training dataset associated with the detected imbalance; transmitting, to a network element of the wireless communication system, a request message indicating the determined minority class and requesting measurement activation to perform one or more measurements, by the UE, to obtain one or more additional signal samples for the minority class; and receiving, from the network element, an activation message causing the UE to perform the one or more measurements during a configured observation window.

According to an aspect, there is provided an apparatus comprising means for performing: receiving, by a network element of a wireless communication system, a request message from a user equipment, UE, of the wireless communication system, the request message indicating a minority class associated with an imbalance in a line-of-sight, LOS, training dataset for training a LOS detector and requesting measurement activation to perform one or more measurements, by the UE, to obtain one or more additional signal samples for the minority class; and transmitting, to the UE, an activation message causing the UE to perform the one or more measurements during a configured observation window.

According to an aspect, there is provided a method for a user equipment, UE, of a wireless communication system, the method comprising: detecting an imbalance in a line-of-sight, LOS, training dataset for training a LOS detector; determining a minority class of the LOS training dataset associated with the detected imbalance; transmitting, to a network element of the wireless communication system, a request message indicating the determined minority class and requesting measurement activation to perform one or more measurements, by the UE, to obtain one or more additional signal samples for the minority class; and receiving, from the network element, an activation message causing the UE to perform the one or more measurements during a configured observation window.

According to an aspect, there is provided a method for a network element of a wireless communication system, the method comprising: receiving a request message from a user equipment, UE, of the wireless communication system, the request message indicating a minority class associated with an imbalance in a line-of-sight, LOS, training dataset for training a LOS detector and requesting measurement activation to perform one or more measurements, by the UE, to obtain one or more additional signal samples for the minority class; and transmitting, to the UE, an activation message causing the UE to perform the one or more measurements during a configured observation window.

According to an aspect, there is provided a computer program comprising instruction for causing an apparatus to perform: detecting, by a user equipment, UE, of a wireless communication system, an imbalance in a line-of-sight, LOS, training dataset for training a LOS detector; determining a minority class of the LOS training dataset associated with the detected imbalance; transmitting, to a network element of the wireless communication system, a request message indicating the determined minority class and requesting measurement activation to perform one or more measurements, by the UE, to obtain one or more additional signal samples for the minority class; and receiving, from the network element, an activation message causing the UE to perform the one or more measurements during a configured observation window.

According to an aspect, there is provided a computer program comprising instruction for causing an apparatus to perform: receiving, by a network element of a wireless communication system, a request message from a user equipment, UE, of the wireless communication system, the request message indicating a minority class associated with an imbalance in a line-of-sight, LOS, training dataset for training a LOS detector and requesting measurement activation to perform one or more measurements, by the UE, to obtain one or more additional signal samples for the minority class; and transmitting, to the UE, an activation message causing the UE to perform the one or more measurements during a configured observation window.

Some embodiments are defined in the dependent claims.

The embodiments that do not fall under the scope of the claims are to be interpreted as examples useful for understanding the disclosure.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which

FIGS. 2 and 3 illustrate flow diagrams according to some embodiments;

DETAILED DESCRIPTION OF SOME EMBODIMENTS

The following embodiments are examples. Although the specification may refer to "an", "one", or "some" embodiment(s) in several locations, this does not necessarily mean that such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1A:
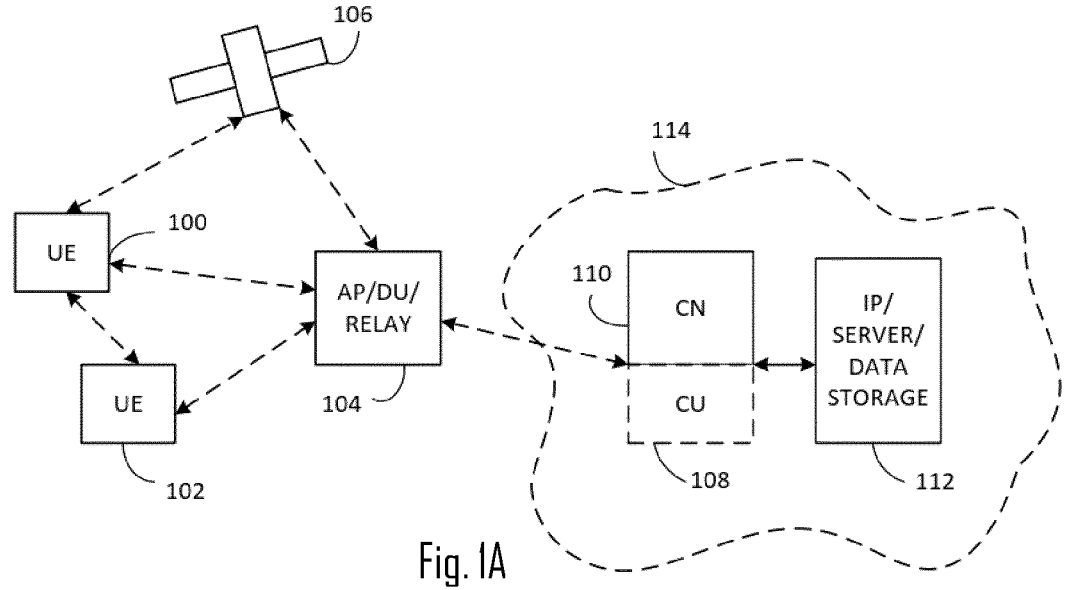
FIG. 1A illustrates an example of a wireless communication system to which embodiments may be applied.

FIG. 1A depicts examples of simplified system architectures showing some elements and functional entities whose implementation may differ from what is shown. The connections shown in FIG. 1A are logical connections; the actual physical connections may be different. It is apparent to a person skilled in the art that the system typically comprises also other functions and structures than those shown in FIG. 1A.

The embodiments are not, however, restricted to the system given as an example but a person skilled in the art may apply the solution to other communication systems provided with necessary properties.

The example of FIG. 1A shows a part of an exemplifying radio access network. FIG. 1A shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3rd Generation Partnership Project (3GPP) specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobility management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink device, of which an example is a camera or video camera loading images or video clips to a network. A user device may also be a device having capability to operate in Internet of Things (IoT) network, such as Industrial IoT (IIoT) network, which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses. User device herein may also refer to vehicular implementations, such as vehicle UEs. Such UEs may be comprised and/or communicatively coupled with vehicle such that they may be understood as part of the vehicle or vehicles.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not necessarily shown in FIG. 1A) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1A by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is an example of a part of a radio access system and in practice, the system may comprise a plurality of (e/g) NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1A may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1A). A HNB Gateway (HNB-GW), which is typically installed within an operator's network may aggregate traffic from a large number of HNBs back to a core network. The network discussed herein may refer to, for example, cellular network such as 5G and the like.

As indicated with an arrow in FIG. 1A, the UEs 100, 102 (and/or any other UE of the described system) may support device-to-device (D2D) communication. D2D communication may sometimes be referred to as sidelink communication.

Figure 1B:
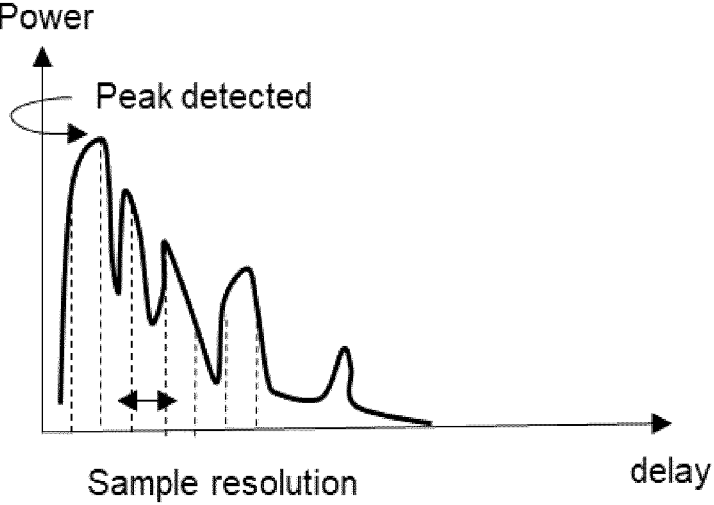
FIG. 1B illustrates time of arrival estimation principle.

UE may measure and report a metric called time-of-arrival (TOA). This metric may be used, for example, for localization and blockage detection for Radio Resource Management (RRM). For example, UE may in addition report a metric called reference signal time difference (RSTD) which may be computed as a difference between TOA measurements. TOA may be understood as the shortest time a signal (e.g. radio signal) takes to travel the distance between a transmitter and a receiver. If TOA is measured correctly, distance may be obtained as $d=TOA \times c$, where $c=$speed of light. To compute TOA, receiver may estimate a power-delay profile (PDP) of the wireless propagation channel and select as TOA the delay at which the PDP exhibits a power peak as depicted in FIG. 1B. TOA may be indicated to the network, and the network may in turn compute the distance d, for example.

However, it may be possible that the strongest component (i.e. the power peak) does not always correspond to the LOS path. This is shown in the examples FIGS. 1C and 1D in which LOS path signal 186 between UE 100 and network node 104 may be blocked or attenuated by an obstacle 184 (e.g. a tree). Power 196 of signal 184 may thus be reduced and lower than power 199 of non-LOS (NLOS) signal 188, 189 that bounces e.g. from a building 182. Hence, the NLOS signal 188, 189 may be selected as TOA, and this may mean that the distance between the UE 100 and the network node 104 may be miscomputed (i.e. determine distance may be longer than it actually is) as NLOS signal 188, 189 travels from network node 104 to building 182 and from the building 182 to the UE instead for the signal travelling directly between the network node 104 and the UE 100.

Furthermore, the radio environment may be dynamic, especially in cmWave and mmWave frequency bands, and movement of the UE and/or radio obstacles in the environment may cause transitions from LOS to NLOS conditions. In practice, therefore the UE may rarely experience a pure LOS or pure NLOS propagation conditions and determining which of these conditions is dominant, and for how long, in the received signals may become a computationally intensive task. It may be beneficial to utilize a machine-learning (ML) based LOS detector. In general, ML methods from the supervised learning category benefit from a balanced training set, i.e. a diverse enough measurement for training in order to obtain a robust design and high accuracy inference results. Imbalanced data may refer to a situation where the number of observations is not the same for all the classes in a training dataset, i.e. the training dataset may have a plurality of classes wherein one or more of said classes has less usable observations than at least one other class. Usable observation here may refer to a measurement that exists and has a reliability that exceeds a given threshold. Sometimes these usable observations may be referred to as trustworthy or relevant observations, measurement results or signal samples. For example, LOS, NLOS and attenuated LOS (ALOS) classes may be present in a LOS training dataset for training the LOS detector. Hence, it may be beneficial to provided solutions that enable reducing or removing imbalance in a LOS training dataset. This may enable the LOS detector to work with improved accuracy in order to detect LOS, NLOS and/or ALOS situations, and thus select TOA and compute distance more accurately.

FIG. 2 illustrates a flow diagram according to an embodiment. Referring to FIG. 2, a method for a UE of a wireless communication network is provided, the method comprising: detecting an imbalance in a LOS training dataset for training a LOS detector (block 202); determining a minority class of the LOS training dataset associated with the detected imbalance (block 204); transmitting, to a network element of the wireless communication system, a request message indicating the determined minority class and requesting measurement activation to perform one or more measurements, by the UE, to obtain one or more additional signal samples for the minority class (block 206); and receiving, from the network element, an activation message causing the UE to perform the one or more measurements during a configured observation window (block 208).

FIG. 3 illustrates a flow diagram according to an embodiment. Referring to FIG. 3, a method for a network element of a wireless communication network is provided, the method comprising: receiving a request message from a UE of the wireless communication system, the request message indicating a minority class associated with an imbalance in a LOS training dataset for training a LOS detector and requesting measurement activation to perform one or more measurements, by the UE, to obtain one or more additional signal samples for the minority class (block 302); and transmitting, to the UE, an activation message causing the UE to perform the one or more measurements during a configured observation window (block 304).

Figure 1C:
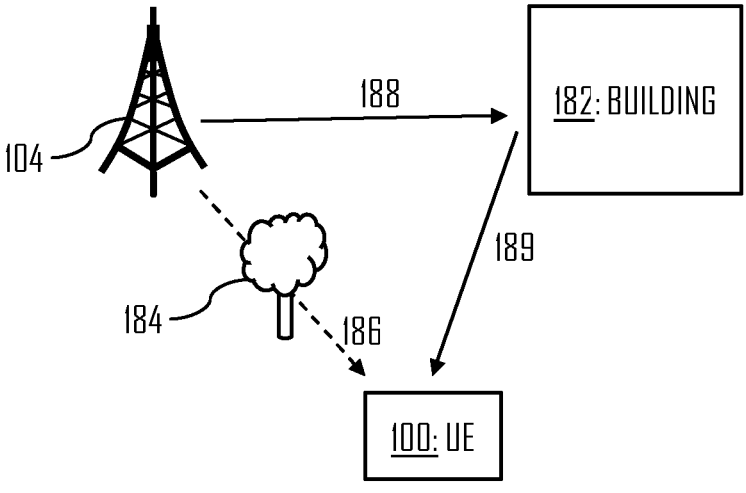
FIGS. 1C and 1D illustrate some examples.
Figure 1D:
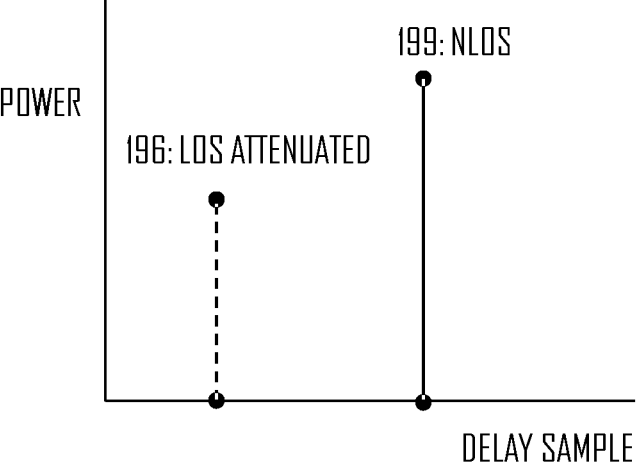

The described methods of FIGS. 2 and 3 may be applicable in the system (e.g. wireless communication network) of FIG. 1A, and in the examples of FIGS. 1C and 1D, for example. The UE(s) discussed with respect to FIGS. 2 and 3 may be, for example, UE 100, or UE 102, or some other similar network device(s) such as a circuitry or circuitries comprised in the UE 100, 102. The network element discussed with respect to FIGS. 2 and 3 may refer to network node 104, or to CN 110/CU 108, for example, or to some other network element configured to carry out the described method steps. For example, the network element may refer to one or more network entities (e.g. physically separate network entities). For example, the one or more network entities may refer to network node 104 and/or location management function (LMF). The one or more measurements may refer to radio signal measurement(s) performed by the UE. The additional signal samples may be obtained (e.g. collected) by the UE by performing the one or more measurements. The signal samples may directly or with further processing indicate and/or comprise parameters and/or indicators, such as signal power, received signal strength indicator (RSSI), signal-to-noise-plus-interference-ratio (SINR), signal-to-noise-ratio (SNR), Doppler shift, channel impulse response and/or power delay power. So, the UE may in other words determine measurement result(s) based on the performed measurement(s). A signal sample may belong to a certain class of the LOS training dataset. Hence, a minority class may have, for example, less relevant signal samples which may cause an imbalance in the LOS training dataset. This imbalance may be corrected or at least mitigated by obtaining further signals samples for the minority class. The obtained additional signal samples may be inserted into corresponding class. Thus, for example, if minority class signal sample is obtained, it may be inserted into the minority class.

The embodiments proposed above may enable the reconfiguration of the LOS detector of the UE by the UE requesting network assistance to compensate for potential performance limitations. To that end, the UE may detect what causes the limited performance. As indicated above, the limited performance may be caused, for example, by an imbalanced training dataset. For example, one class may have less measurements or observations than some other class in the training dataset, wherein the difference between observations or measurements in the classes exceeds a threshold. Once the UE has detected a class imbalance, signaling between the UE and the network may be exchanged in order to request and respectively grant resources to enable the UE to collect measurements to at least reduce (i.e. reduce or remove) the imbalance, and thus enable the reconfiguration of the LOS detector with greater accuracy. This may mean that the ML based LOS detector may operate more efficiently and/or accurately if the reconfiguration is performed with a training dataset that has less imbalance. Hereinafter, we refer to signal samples which may sometimes be understood as observations, measurements, measurement samples or measurement results. The signal samples may be obtained by performing measurement(s), e.g. by the UE.

Furthermore, measurement activation as used herein may refer to activation of one or more measurements for obtaining one or more additional signal samples. Measurement activation, as discussed below, may comprise indication by the network that the one or more measurements should be activated. Such indication may be realized by transmitting an activation message from the network to the UE. Further, in some examples, the measurement activation further comprises and/or indicates measurement configuration to be used in performing the one or more measurements. In other examples, the measurement configuration may be provided, to the UE, prior to requesting the measurement activation by the UE. According to some example embodiments, the UE may collect and/or store a set of channel measurements corresponding to configured X LOS classes. For example, X=3, with labels: LOS, NLOS, ALOS. So, the training dataset may have LOS, NLOS, and ALOS classes. However, this is an example and a different classification system may be used. The initial values in the classes may be obtained via UE measuring and/or they may be prestored in the UE e.g. in a laboratory environment.

Figure 4:
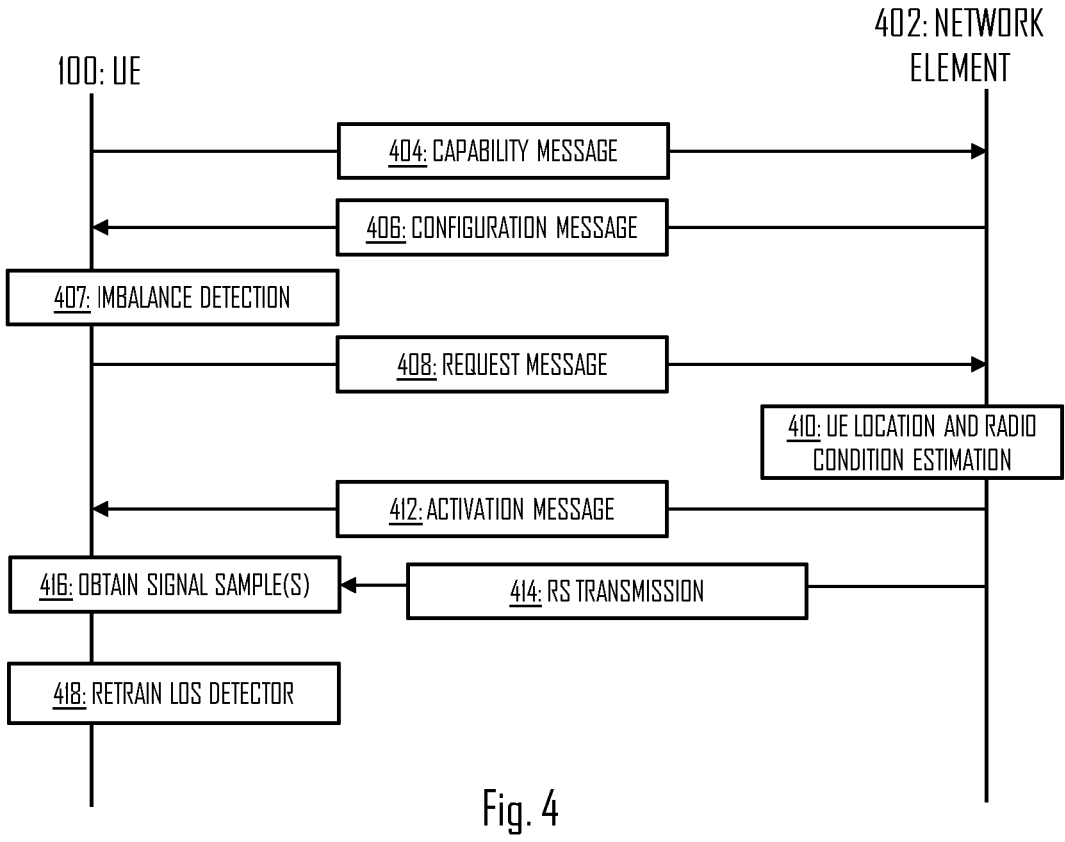
FIGS. 4 and 5 illustrate signal diagrams according to some embodiments.

The UE 100 may further inform the network (e.g. network element 402 of FIG. 4) about its ML capabilities (see e.g. FIG. 4: block 404). The ML capability message may indicate that the UE utilizes ML based LOS detector, for example.

In some examples, the network element 402 may send a configuration message to the UE 100 (see e.g. block 406 of FIG. 4). The configuration message may comprise an observation window configuration. That is, the network element 402 may specify the window's duration Tc, and its start time, T_start relative to a predetermined message (this is discussed later in detail).

In some examples, periodically, or triggered by the network element 402, the UE 100 may estimate or detect the presence of the class imbalance (see e.g. block 407 of FIG. 4). A class imbalance may be detected when, after selecting relevant signal samples, the ratio between the sizes of different class signal samples is e.g. less than a predetermined threshold (e.g. 0.5). Relevant signal samples may include, for example:

Signal samples with estimated signal-to-noise-ratio (SNR) levels above a set threshold (see SNR threshold below).

Signal samples with medium or low Doppler shift. A certain threshold may be utilized here also.

So, in general, the UE 100 may ignore signal samples that may not be relevant, e.g. are inaccurate or have too much noise. Therefore, relevant signal samples may be taken into account in determining whether or not imbalance in the training dataset exists.

Once a class imbalance is detected (e.g. in response to detecting the class imbalance and/or after detecting the imbalance), the UE 100 may send to the network a reconfiguration request for obtaining new channel signal samples belonging to the minority class (e.g. class with least available relevant signal samples). This may be seen e.g. in block 408 of FIG. 4. The UE 100 may also report, to the network element 402, the severity of the class imbalance, e.g. the imbalance ratio, an indicator of the imbalance such as medium or high, and/or another suitable indication of the relative sizes of the different class signal samples. At this point, we note that UE 100 may determine the severity of the imbalance. Thus, it may, for example, determine how many additional signal samples for the minority class is required in order to at least reduce the imbalance to acceptable level. The acceptable level may be network configured or preconfigured, or determined by the UE (e.g. by the LOS detector), for example. Thus, for example, the severity indication may in some cases be simple as indicating how many additional signal samples is requested to be obtained for at least reducing the imbalance to the acceptable level. In an example, level here may refer to a ratio between the number of signals samples in the minority class and the total number of signal samples.

The network element 402 may evaluate the request and based on UE 100 location prediction and channel characterization at such predicted location, the network element 402 may determine whether the minority class is likely to occur in the observation window (e.g. during the observation window). In case the network element 402 determines that minority class signal samples may be obtained in the observation window, the network 402 may send a trigger (see e.g. block 412 of FIG. 4) to the UE 100 to start collecting new measurements in the observation window. The observation window may have been indicated previously to the UE 100, or the network element 402 may provide new configuration to the UE 100 in case the network element 402 determines that radio conditions of the UE 100 have changed. In some examples, the change may be determined to satisfy a condition (e.g. exceed a threshold), before reconfiguring the observation window for the UE 100.

The UE 100 may collect the signal samples by performing measurement(s) in the configured observation window, tag them with the corresponding class label (i.e. minority class is target, but signal samples belonging to some other classes may be additionally or alternatively obtained due to the fact that the radio conditions might be different than predicted), timestamps them and buffers them internally. Additionally, the UE 100 may add other labels to the signal samples, as described in more detail below.

So, the network element 402 may estimate radio conditions of the UE 100 at a certain future location and determine whether the UE 100 may obtain minority class signal samples on those estimated radio conditions. For example, if LOS is the minority class, and the network determines that during the observation window, based on UE 100 location prediction and radio condition estimation, the UE 100 is experiencing NLOS radio conditions, the network may not necessarily trigger the UE 100 to perform measurements as the signal samples may not reduce or remove the imbalance of the training dataset. However, if LOS radio conditions are predicted, the triggering may be performed. It may also be possible to adjust the configuration window duration and/or start time in some examples. So, for example, if initial observation window would lead to wrong class signal samples, the window may be reconfigured if that may lead to signal samples for the minority class.

Let us then look closer on some embodiments with first referring to FIG. 4. Network element 402 may refer to the network element performing e.g. steps of FIG. 3. In an embodiment, the UE 100 is configured to obtain the one or more additional signal samples for the minority class (block 416); and after the obtaining the one or more additional signal samples, retrain the LOS detector with the LOS training set (block 418). So, after receiving the activation message from the network element 402, the UE 100 may perform the measurement(s) to obtain the signal sample(s). Thus, the imbalance may at least be reduced, and the LOS detector retrained with the more balanced training dataset.

In an embodiment, the UE 100 is further configured to receive, from the network element 402, a configuration message comprising observation window configuration information. I.e. the network element 402 may transmit the configuration message to the UE 100. The observation window configuration information may comprise, for example, Tc and T_start which were defined above. As discussed above, the T_start may indicate start time of the observation window relative to an index of a subframe carrying a predetermined message or a system frame number (SFN) frame. For example, Tc may be is expressed as in the format of absolute time.

In an embodiment, the predetermined message is the request message of block 408 and the subframe is an uplink subframe. So, this essentially may mean that the start time of the observation window is relative to the transmittance of the request message of block 408.

In an embodiment, the predetermined message is the activation message of block 412 and the subframe is a downlink subframe. So, this essentially may mean that the start time of the observation window is relative to the transmittance of the activation message of block 412.

In some embodiments, before receiving the configuration message of block 406, the UE may send, in block 404, a ML capability message to the network element 402. The message may comprise a list of ML-based functionalities that can be retrained on the fly at the UE side. For example, the UE may indicate, with said message, that it has ML based LOS detector. Other capabilities which may be indicated may include: ML based channel estimator and ML based decoder. This information may be a part of the general UE capabilities exchange procedure or can be exchanged on-demand.

The network element 402 may determine, based on the capability message of block 404, that the UE 100 has ML based LOS detector. Thus, it may, for example, determine to configure the observation window in block 406. This configuration message of block 406 may sometimes be referred to as ML configuration message in which the observation window may be defined.

In block 407, the UE 100 may perform imbalance detection to detect the presence of a class imbalance and, in case imbalance is detected, report to the network element 402 the detected imbalance by transmitting the request message in block 408. The imbalance detection (e.g. as in block 407) is discussed in detail with respect to FIG. 10. The request message may indicate the minority class, i.e. the class that causes the imbalance and to which additional signal samples may be needed. In addition, the request message may indicate a severity of the imbalance (e.g. imbalance ratio or relative indicator (e.g. high, medium, low)). In addition, the request message (sometimes referred to as reconfiguration request) may comprise data on UE speed, direction and/or future location. This information may sometimes be referred to as UE mobility level. The UE mobility level may be reported to the network element 402.

In block 410, the network element 402 may evaluate when and/or if the UE may experience channel conditions corresponding to the reported minority class. So, the network element 402 may estimate the UE's future location and further estimate radio conditions in said future location. For example, the network element 402 may generate a geo-map (e.g. 2D/3D), such as LOS map, using information about the radio environment (e.g. buildings, streets etc.) and location of the network element 402 and the UE 100. This map may be used in determining radio conditions at certain future positions of the UE. Skilled person understands to utilize various techniques and methods known in the art for estimating UE's future location and radio conditions in said future locations. Hence, these are not discussed herein in further detail. For example, a two-step approach may be utilized:

a. First the network element 402 predicts the UE 100 future location based on the reported mobility level (sometimes referred to as mobility data as in FIG. 6B: block 618), historical data, time of day, road type, road layout, road direction and/or buildings layout to name a few examples.

b. Second, the network element 420 checks whether the channel conditions at the predicted location are likely to correspond to the reported minority class and if so, the network element 402 sends a trigger message to the UE 100 to start measurement collection (block 412: activation message). That is, the measurement may be activated.

The UE 100 may receive the trigger signaling (i.e. activation message), which may, for example, be in the format of Medium Access Control (MAC) Control Element (CE) or Physical Layer (PHY) Downlink Control Information (DCI) (or other type of downlink control carried over Physical Downlink Control Channel (PDCCH), for example) from the network element 402 and start recording the channel signal samples during the configured observation window (block 416). The UE may label them with the minority class, and with other locally generated labels such as estimated SNR and Rotation Label (RL). As shown in FIG. 4, the network element 402 may in some embodiments transmit Reference Signal (RS) (block 414). The transmitted RS may be used for block 416. I.e. the UE 100 may perform measurements on radio channel(s) on which the RS is transmitted, and obtain signal samples. The signal samples may be labeled e.g. with class label, SNR label, Doppler shift label and/or with RL, to name a few examples. That is, the UE 100 may perform measurement(s) during the observation window during which the network element 402 may transmit the RS, obtain the additional signal samples, and label the additional signal samples accordingly.. As discussed above, in block 418 the UE 100 may retrain the LOS detector with the updated training dataset.

Figure 5:
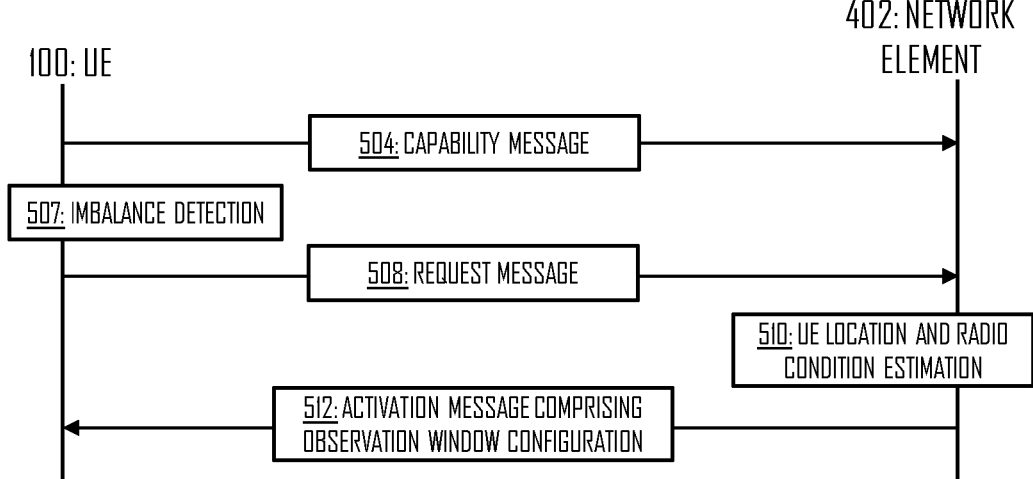

FIG. 5 illustrates an embodiment in which the activation message comprises the observation window configuration information. So, instead of needing to transmit two messages (i.e. configuration message and activation message as in the example of FIG. 4), the network element 402 may transmit the activation message including same or similar information as the configuration message. In some cases, however, the network element 402 may transmit both configuration and activation messages and still include observation window configuration information into the activation message. This may be because the observation window configuration information may be updated after the transmission of the configuration message, for example. In some examples, activation message comprising configuration information is referred to as configuration message.

So, in block 504, the UE 100 may transmit the capability message as in block 404. Instead of waiting for the configuration message 404 or some other trigger to start imbalance detection, the UE 100 may initiate imbalance detection as shown in block 507. For example, the imbalance detection may be periodic, and performed as in block 407.

In case imbalance is detected, the UE 100 may transmit the request message to the network element 402 (block 508). This may be similar as in block 408.

In block 510, the network element 402 may perform UE location and radio condition estimation as in block 410. This may be based on UE mobility level reported by the UE in the request message or determined by the network element 402 e.g. based on network information. For example, the network information may indicate previously serving cells of the UE. This information may be used to predict where the UE is moving and at what pace.

In block 512, if the network element 402 so determines, activation message may be transmitted to the UE 100 to start performing measurement(s) in order to balance the imbalanced training dataset. The activation message may configure the UE 100 to utilize the indicated observation window in order to obtain the additional signal samples for the minority class e.g. similarly as discussed with respect to blocks 416 and 418, for example. For example, the network element 402 may transmit RS in FIG. 5 similarly as in FIG. 4.

Figures 6A, 6B, 6C:
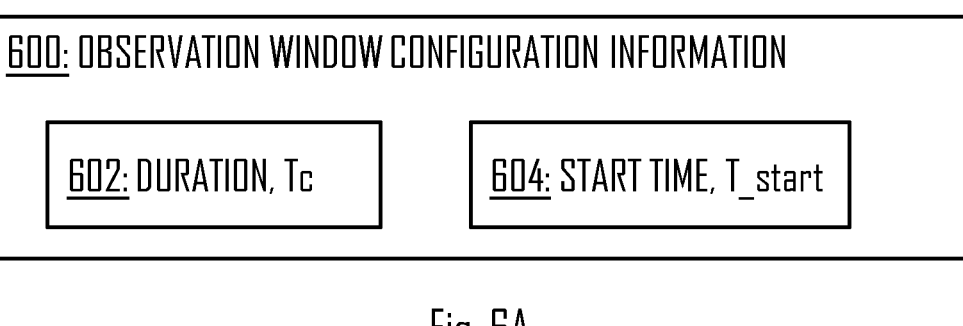
FIGS. 6A, 6B, 6C, 7, 8A, 8B, 9, and 10 illustrate some embodiments.

FIGS. 6A, 6B, and 6C illustrate block diagrams of some embodiments. Referring to FIG. 6A, as discussed above, the observation window configuration information 600 may comprise duration (i.e. Tc) 602 and start time (i.e. T_start) 604 of the observation window. The start time may be relative to an index of a subframe carrying a predetermined message or relative to SFN frame. For example, Tc can be expressed as absolute time. As discussed, the predetermined message may be the request message or the activation message, for example. In an embodiment, the observation window configuration information 600 further indicates which message is the predetermined message (e.g. request message or the activation message). This way the UE 100 and the network element 402 may determine the observation window similarly, and thus the RS transmission, e.g. by the network element 402, may be measured by the UE 100 at correct time.

Referring to FIG. 6B, the request message 610 (e.g. block 408, 508) may comprise indication about the minority class 612. Further, the request message 610 may comprise mobility data 618 (sometimes referred to as mobility level or mobility status) on the UE 100 and/or severity indicator 614. The severity indicator may indicate a severity of the imbalance of the minority class 612. The severity indicator 614 may comprise, for example, imbalance ratio 616.

Referring now to FIG. 6C, an activation message 620 is shown (e.g. transmitted in block 412 or 512). According to an embodiment, the activation message 620 indicates acknowledgement, ACK, or non-acknowledgement, NACK (block 622), wherein in the case of ACK the activation message causes the UE 100 to perform the one or more measurements during the configured observation window, and wherein in the case of NACK the activation message causes the UE 100 to prevent performing the one or more measurements. So, in essence, the activation message transmitted in blocks 412, 512 does not necessarily cause triggering of the measurements in all embodiments if NACK is indicated. Example of this is shown in FIG. 8B illustrating an embodiment.

Figure 8A:
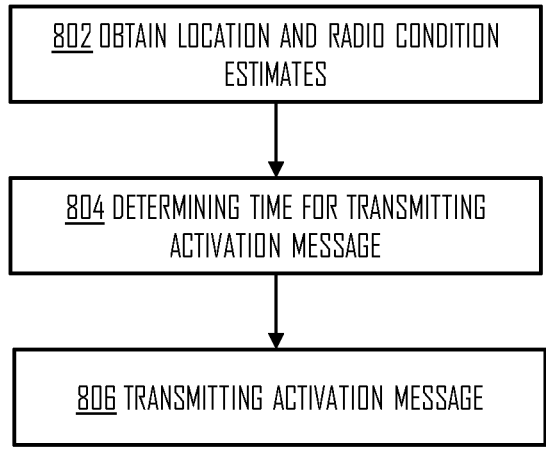
Figure 8B:
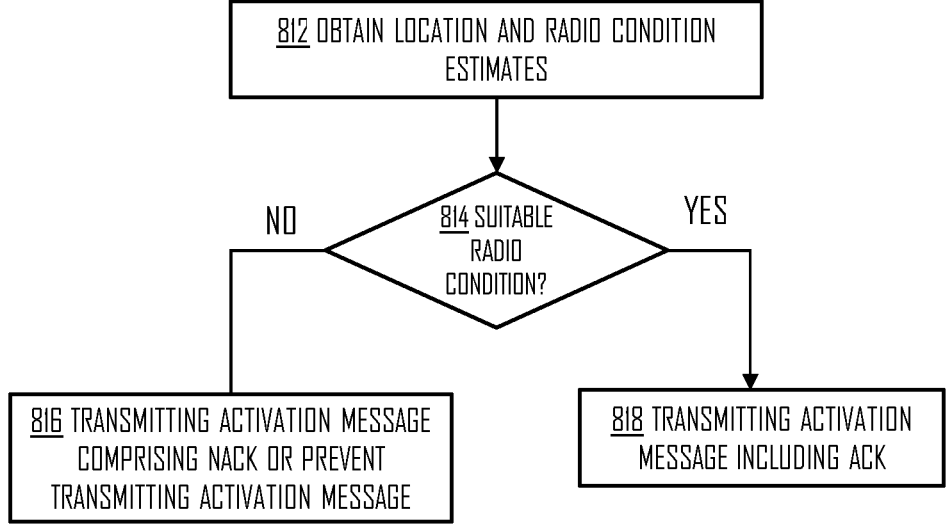

Referring to FIG. 8B, the network element 402 may obtain location and radio condition estimates regarding the UE 100 (block 812). I.e. radio conditions at an estimated future location may be estimated as discussed already with reference to FIGS. 4 and 5 above. In block 814, the network element 402 determines whether or not the estimated radio conditions are suitable during the observation window. If not, process may continue to block 816. If yes, process may continue to block 818.

In block 816, the network element 402 may transmit the activation message including NACK or prevent transmitting the activation message. In both cases, the UE 100 may not initiate the measurements.

In block 818, the network element 402 may transmit the activation message including ACK. Hence, the UE 100 may initiate the measurements during the configured observation window.

In an embodiment, in block 814, even if the radio conditions are suitable, the process may continue to block 816 if there are no training signals (i.e. RS) available. That is, if the network element 402 does not have resources for transmitting the RS, the activation message may not be sent or may include NACK.

FIG. 8A illustrates an embodiment. Similarly, as in FIG. 8B, the UE's future position and future position's radio conditions may be estimated in block 802 by the network element 402. Based on block 802, the network element 402 determines a time for transmitting the activation message. In block 806, the network element 402 may transmit the activation message at said time. Said time may refer to a certain time instant, for example. So, it is possible that the network element adjusts the time when the activation message is transmitted in order to change the start time of the observation window. For example, this may be beneficial in the cases where the transmission time of activation message has an effect on when the configuration window starts (e.g. T_start is relative to the index of a downlink subframe carrying the activation message). So, without changing the configuration information on the observation window, the network element 402 may adjust the time when the measurement(s) are performed, e.g. for increasing probability of obtaining signal sample(s) for the minority class.

Figure 7:
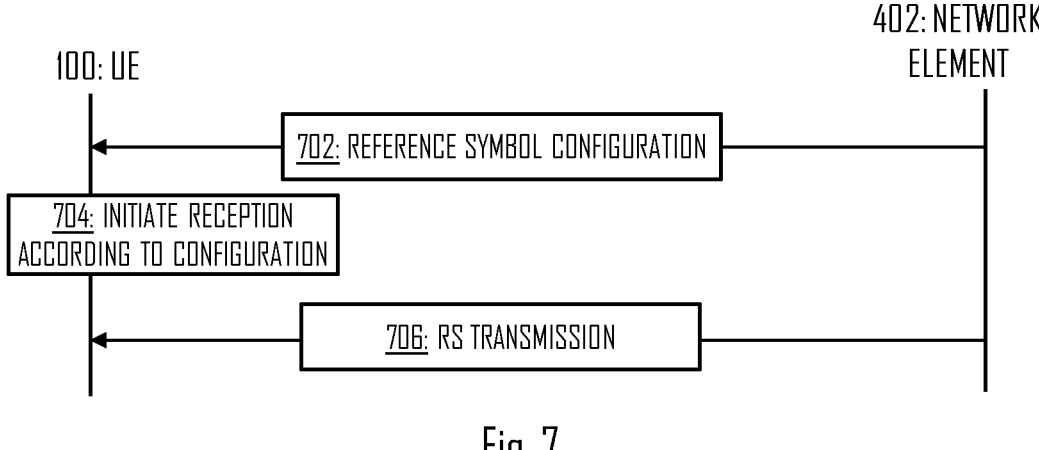

FIG. 7 illustrates an embodiment. Referring to FIG. 7, the network element 402 may transmit a reference symbol configuration to be used for retraining the LOS detector (block 702). The UE 100 may receive the configuration and utilize the reference symbol configuration in retraining the LOS detector by initiating reception of training signals according to the reference symbol configuration (block 704). In block 706, the network element 402 may transmit RS (may be referred to as training signals) according to the configuration. According to an embodiment, one or more steps of FIG. 7 are comprised in block 414 of FIG. 4.

In an embodiment, the reference symbol configuration is transmitted to the UE 100 in at least one separate message.

In an embodiment, the reference symbol configuration is transmitted to the UE 100 in the configuration message (e.g. block 406) or in the activation message (block 512).

Figure 9:
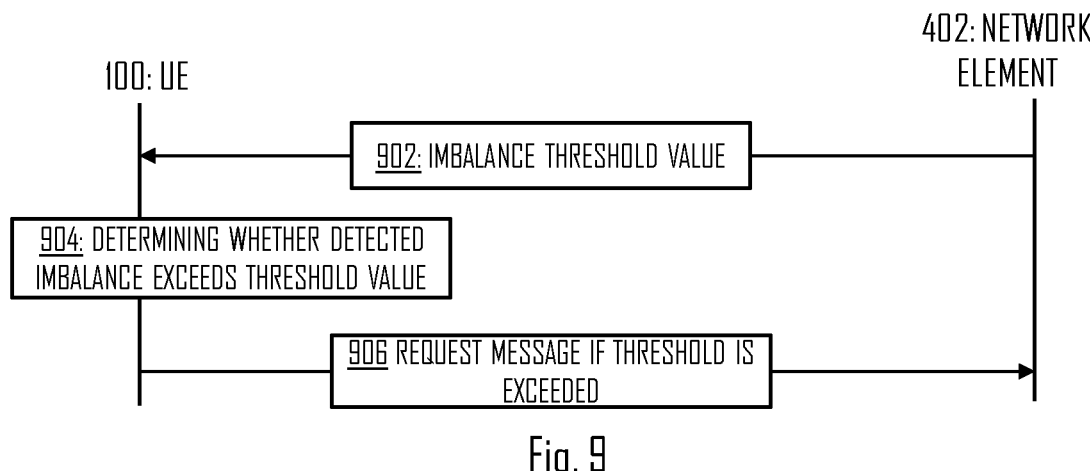

FIG. 9 illustrates an embodiment. Referring to FIG. 9, the network element 402 may transmit an imbalance threshold value to the UE 100 (block 902). The UE 100 may receive the imbalance threshold value.

In block 904, the UE 100 may determine whether the detected imbalance (e.g. block 202) satisfies (e.g., exceeds) the imbalance threshold value.

In the case that the imbalance exceeds the imbalance threshold, which, for example, may be configured by network element 402, the UE 100 may transmit the request message (e.g. block 206) to the network element 402 (block 906). Otherwise (i.e. if the imbalance does not exceed the threshold), the UE 100 may prevent transmitting the request message.

Imbalance threshold may be, for example, an imbalance threshold ratio or minimal imbalance ratio for which the UE is expected to send the request message. In some examples, the ratio is 0.5 meaning that if a class has less than half the number of relevant signal samples compared with a class that has most relevant signal samples, the request message may be transmitted. However, the ratio may be different than 0.5 (e.g. 0.6 or 0.7 or something else). In an embodiment, the network determines the threshold ratio. As noted above, if request message is transmitted, the message may comprise severity of the class imbalance. E.g. if 0.5 is exceeded, the actual ratio may be indicated between 0 and 0.5.

In an embodiment, the imbalance threshold value is transmitted to the UE 100 as a separate message.

In an embodiment, the imbalance threshold value is comprised in the configuration message (block 406).

Figure 10:
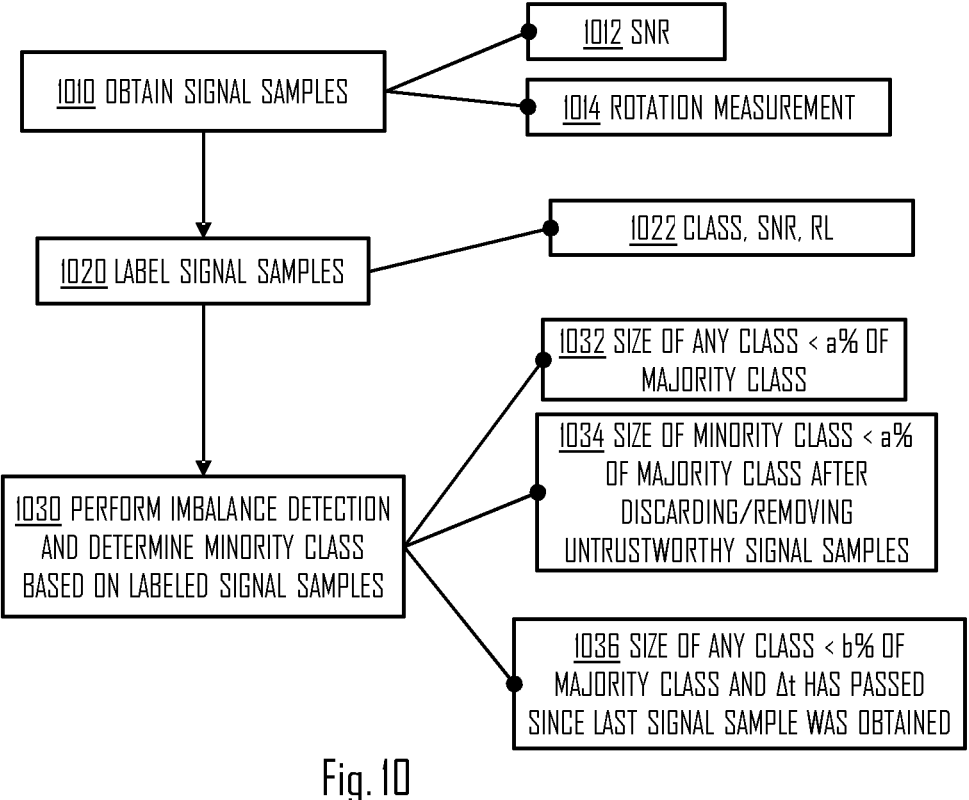

Let us then discuss in more detail the imbalance detection (e.g. block 202, 407, 507) with reference FIG. 10 illustrating some embodiments. Referring to FIG. 10, the class imbalance detection may comprise maintaining signal samples having an associated label(s), such as class, SNR and RL. For example, channel impulse response and/or power delay power (PDP) may be determined from a signal sample. These values may be used as inputs to the LOS detector for training the LOS detector. Hence, values derived from the signal samples may, for example, be used as inputs to the LOS detector. Based on the labeled signal samples stored in the UE 100, the UE may perform the imbalance detection as shown in block 1030. The maintained (i.e. stored) signal samples may be prestored and prelabeled and/or they may be obtained in block 1010 by performing measurement(s) and labeled in block 1020.

In block 1010, UE 100 may collect or obtain signal samples. The obtained signal samples may be used as inputs for the LOS detector. For example, the raw signal samples may be inputted to the LOS detector. As discussed, signal samples may include information from which signal power and/or SNR 1012 may be derived. As discussed, other parameters, such as PDP or channel impulse response may be determined based on the signal samples, e.g. per signal sample set. Further, rotation measurement 1014 may be performed to obtain RL associated with the signal sample. For example, SNR (or SINR) and/or RL may be used to filter irrelevant signal samples to obtain relevant signal samples. The relevant signal samples may be used as inputs for the LOS detector, for example.

In block 1020, the signal samples may be labeled with class, SNR and/or RL (block 1022) to name a few examples. For example, LOS, NLOS, and ALOS classes may be used.

Thus, signal sample may have a class, an associated SNR and a RL. The RL may, for example, be {high, medium, low} and may be derived from the UE's rotation measurement (block 1014) performed by a sensor unit (see e.g. block 1150 of FIG. 11). The sensor unit may comprise a rotation sensor and/or an inertial measurement unit (IMU). The sensor unit 1150 may measure 3D-rotation belonging to 3 different ranges, for example. The sensor unit 1150 may have a refresh rate of tens of Hz and detect motion in any/all the 3D directions at a high resolution (e.g. mm range shifts), for example.

In an embodiment, the UE removes or gives a smaller weight for signal samples having high or medium RL. Thus, if RL exceeds a threshold, the UE may discard the associated signal samples, for example. The threshold may be configured by the network or preconfigured, for example.

The UE 100 may detect class imbalance if at least one of the following conditions is fulfilled:

The size of any class in the training dataset is less than a % of the size of the majority class (block 1032). a % may be 60, for example.

The size of any class is less than a % of the size of the majority class, after untrustworthy signal samples have been discarded or removed (block 1034).

Untrustworthy measurements may comprise signal samples having SNR exceeding a threshold (e.g. SNR<SNR threshold), signal samples having RL exceeding a RL threshold, and/or signal samples having Doppler shift exceeding a threshold.

The size of any class is less than b % of the size of the majority class and Δt has passed since the latest signal sample has been collected (block 1036).

For example, b>a and Δt may equal to z number of subframes, where z may be a positive integer number (e.g. 1, 2, 3, 4 etc.). So, even though the class imbalance would not be as high as in the previous examples where a % was utilized, the signal samples may be updated to improve their diversity.

According to an embodiment, the UE 100 transmits the request message if detected imbalance exceeds a first threshold or if the imbalance exceeds a second threshold and a predetermined time has passed since last signal sample was obtained. So, for example, if detected imbalance ratio is smaller than first threshold ratio, the request message may be transmitted. For example, if detected imbalance ratio is smaller than second threshold ratio and Δt has passed since last signal sample was obtained, the request message may be transmitted. First threshold ratio may be smaller than second threshold ratio, for example. If said conditions are not met, the request message may not be transmitted.

The SNR threshold and RL threshold may be preconfigured or configured by the network to the UE 100, for example. For example, SNR may need to be higher than the given threshold and/or RL lower than the given threshold in order to deem the signal sample relevant/trustworthy. Similarly, the Doppler shift may need to be lower than the given threshold in order to deem the signal sample relevant/trustworthy. If signal sample is deemed relevant, it may be taken into account in determining the class imbalance. If signal sample is deemed irrelevant/untrustworthy, it may not be taken into account in determining the class imbalance.

The proposed may provide benefits such as improving accuracy of LOS reports by the UE to the network. For example, the improved accuracy may be experience in cases where UE assist the network in determining position of the UE. In UE-based positioning, the proposed may improve the location estimation by increasing probability of correctly selecting the LOS TOA for detectable cells. Furthermore, the proposed Radio Resource Control (RRC) signaling may be used for cases where UE reports the change in LOS conditions, or directly the estimated LOS or NLOS labels. RRC signaling may be used to make certain adjustments, e.g. triggering new UE measurements (e.g. measurements of block 416, for example). RRC signaling may be used, for example, to transmit configuration and reconfiguration messages. Such configuration/reconfiguration messages may be sent with other messages as well, for example, as multicast/broadcast message in case the configuration is common to multiple UEs. So, network element 402 may configure a plurality of UEs at the same time to utilize same observation window, for example.

Figure 11:
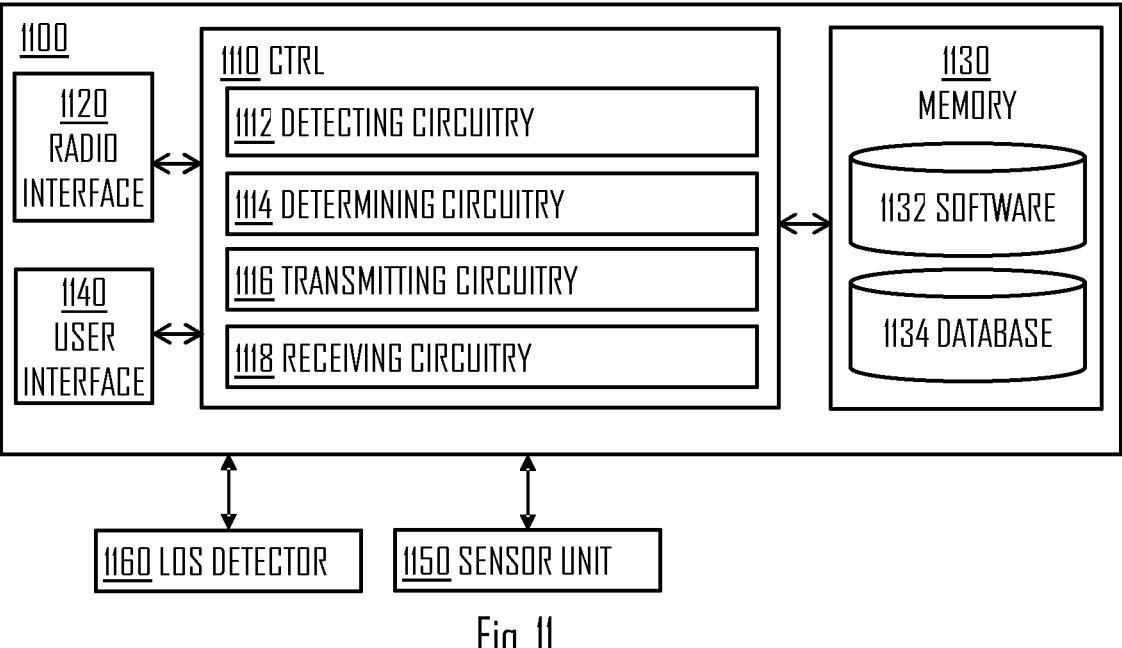
FIGS. 11 and 12 illustrate apparatuses according to some embodiments.
Figure 12:
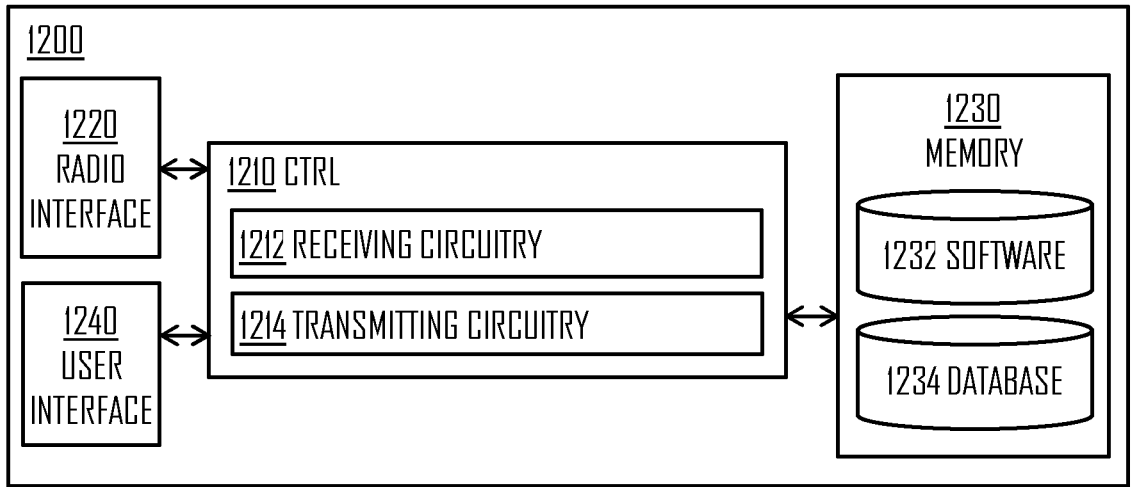

FIGS. 11 and 12 provide apparatuses 1100, 1200 comprising a control circuitry (CTRL) 1110, 1210, such as at least one processor, and at least one memory 1130, 1230 including a computer program code (software) 1132, 1232, wherein the at least one memory and the computer program code (software) 1132, 1232, are configured, with the at least one processor, to cause the respective apparatus 1100, 1200 to carry out any one of the embodiments of FIGS. 1A to 10, or operations thereof.

Referring to FIGS. 11 and 12, the memory 1130, 1230, may be implemented using any suitable data storage technology, such as semiconductor based memory devices, flash memory, magnetic memory devices and systems, optical memory devices and systems, fixed memory and removable memory. The memory 1130, 1230 may comprise a database 1134, 1234 for storing data. For example, training dataset may be stored and updated in the memory 1130.

The apparatus 1100, 1200 may further comprise radio interface (TRX) 1120, 1220 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de)modulator, and encoder/decoder circuitries and one or more antennas. TRX may be utilized to perform the one or more measurements to obtain the one or more additional signal samples.

The apparatus 1100, 1200 may comprise user interface 1140, 1240 comprising, for example, at least one keypad, a microphone, a touch display, a display, a speaker, etc. The user interface 1140, 1240 may be used to control the respective apparatus by a user of the apparatus 1100, 1200.

In an embodiment, the apparatus 1100 may be or be comprised in a UE performing the method described above e.g. with respect to FIG. 2. For example, the apparatus 1100 may be or be comprised in the UE 100 or UE 102.

In an embodiment, the apparatus 1200 may be or be comprised in a network element performing the method described above e.g. with respect to FIG. 3. For example, the apparatus 1200 may be or be comprised in the network element 402 or in the network node 104.

According to an embodiment, with reference to FIG. 11, the control circuitry 1110 comprises a detecting circuitry 1112 configured at least to perform operations described with respect to block 202 of FIG. 2; a determining circuitry 1114 configured at least to perform operations described with respect to block 204 of FIG. 2; a transmitting circuitry 1116 configured at least to perform operations described with respect to block 206 of FIG. 2; and a receiving circuitry 1118 configured at least to perform operations described with respect to block 208 of FIG. 2.

According to an embodiment, the apparatus 1100 comprises the sensor unit 1150 discussed above in more detail.

The apparatus 1100 may further comprise a LOS detector 1160. The LOS detector 1160 may be ML based, for example. The LOS detector 1160 may be the same or similar LOS detector that was discussed with reference to FIGS. 2 and 3, for example.

According to an embodiment, with reference to FIG. 12, the control circuitry 1210 comprises a receiving circuitry 1212 configured at least to perform operations described with respect to block 302 of FIG. 3; and a transmitting circuitry 1214 configured at least to perform operations described with respect to block 304 of FIG. 3.

In an embodiment, at least some of the functionalities of the apparatus 1200 may be shared between two physically separate devices, forming one operational entity. Therefore, the apparatus 1200 may be seen to depict the operational entity comprising one or more physically separate devices for executing at least some of the described processes. Thus, the apparatus 1200 utilizing such shared architecture, may comprise a remote control unit (RCU), such as a host computer or a server computer, operatively coupled (e.g. via a wireless or wired network) to a remote radio head(s) (RRH) located in a base station or network node 104, for example. In an embodiment, at least some of the described processes may be performed by the RCU. In an embodiment, the execution of at least some of the described processes may be shared among the RRH and the RCU. For example, CU/DU split may utilize such shared architecture.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

According to an aspect there is provided a system comprising a plurality of apparatuses 1100 and one or more apparatuses 1200. Hence, the apparatus 1200 may configure a plurality of UEs with observation window, wherein the observation window may be shared between UEs or is UE specific.

As used in this application, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that utilize software or firmware for operation, even if the software or firmware is not physically present. This definition of 'circuitry' applies to uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1A to 10 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1A to 10 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1A to 10, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FP-GAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1A to 10 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, words and expressions herein should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:

at least one processor; and at least one memory including computer program code, the at least one memory and the computer program code configured to, with the at least one processor, cause the apparatus to:

detect an imbalance in a line-of-sight, LOS, training dataset for training a LOS detector;

determine a minority class of the LOS training dataset associated with the detected imbalance;

transmit, to a network element of a wireless communication system, a request message indicating the determined minority class and requesting measurement activation to perform one or more measurements to obtain one or more additional signal samples for the minority class; and receive, from the network element, an activation message causing the apparatus to perform the one or more measurements during a configured observation window, wherein the at least one memory and the computer program code are further configured to, with the at least one processor, cause the apparatus to:

obtain the one or more additional signal samples for the minority class; and after obtaining the one or more additional signal samples, retraining the LOS detector with the LOS training set, wherein the activation message comprises observation window configuration information, wherein the observation window configuration information indicates a duration of the observation window and a start time of the observation window relative to an index of a subframe carrying a predetermined message or relative to a system frame number, wherein the predetermined message is the request message and the subframe is an uplink subframe, or the predetermined message is the activation message and the subframe is a downlink subframe.

2. The apparatus of claim 1, wherein the at least one memory and the computer program code are further configured to, with the at least one processor, cause the apparatus to:

detect class imbalance if the following conditions are fulfilled:

the size of any class in the training dataset is less than a percentage of the size of a majority class, the size of any class is less than a percentage of the size of the majority class, after untrustworthy signal samples have been discarded or removed, untrustworthy measurements comprise signal samples having SNR exceeding a threshold, signal samples having RL exceeding a RL threshold, and signal samples having Doppler shift exceeding a threshold, and the size of any class is less than a given percentage of the size of the majority class and $\Delta t$ has passed since the latest signal sample has been collected.

3. The apparatus of claim 1, wherein the at least one memory and the computer program code are further configured to, with the at least one processor, cause the apparatus to:

after a class imbalance is detected, send to the network a reconfiguration request for obtaining new channel signal samples belonging to the minority class;

report, to the network element, the severity of the class imbalance comprising an imbalance ratio, an indicator of the imbalance and of the relative sizes of the different class signal samples;

determine the severity of the imbalance by determining how many additional signal samples for the minority class is required to at least reduce the imbalance to an acceptable level, the acceptable level being network configured or preconfigured, or determined by the LOS detector).

4. The apparatus of claim 1, wherein the at least one memory and the computer program code are further configured to, with the at least one processor, cause the apparatus to:

receiving, from the network element, a configuration message comprising observation window configuration information.

5. The apparatus of claim 4, wherein the signal samples may directly indicate and comprise parameters and indicators that include at least signal power, received signal strength indicator (RSSI), signal-to-noise-plus-interference-ratio (SINR), signal-to-noise-ratio (SNR), Doppler shift, channel impulse response and power delay power.

6. The apparatus of claim 5, wherein the at least one memory and the computer program code are further configured to, with the at least one processor cause the apparatus to:

collect the signal samples by performing measurements in the configured observation window;

tag the signal samples with a corresponding class label;

timestamps the signal samples; and buffer the signal samples internally.

7. The apparatus of claim 1, wherein the request message further comprises a severity indicator being indicative of a severity of the imbalance.

8. The apparatus of claim 1, wherein the at least one memory and the computer program code are further configured to, with the at least one processor, cause the apparatus to:

receive, from the network element, an imbalance threshold value; determine whether the imbalance satisfies the imbalance threshold value; and based on determining that the imbalance satisfies the imbalance threshold, transmit the request message to the network element, otherwise prevent transmitting the request message.

9. The apparatus of claim 1, wherein the activation message indicates acknowledgement, ACK, or non-acknowledgement, NACK, wherein an indication of ACK causes the apparatus to perform the one or more measurements during the configured observation window, and wherein an indication of NACK causes the apparatus to prevent performing the one or more measurements.

10. The apparatus of claim 1, wherein the at least one memory and the computer program code are further configured to, with the at least one processor, cause the apparatus to:

receive, from the network element, a reference symbol configuration to be used for retraining the LOS detector; and utilize the reference symbol configuration in retraining the LOS detector by initiating reception of training signals according to the reference symbol configuration.

11. An apparatus comprising: at least one processor; and at least one memory including computer program code, the at least one memory and the computer program code configured to, with the at least one processor, cause the apparatus to:

receive a request message from a user equipment, UE, of a wireless communication system, the request message indicating a minority class associated with an imbalance in a line-of-sight, LOS, training dataset for training a LOS detector and requesting measurement activation to perform one or more measurements, by the UE, to obtain one or more additional signal samples for the minority class; and transmit, to the UE, an activation message causing the UE to perform the one or more measurements during a configured observation window, wherein the at least one memory and the computer program code are further configured to, with the at least one processor, cause the apparatus to:

obtain a location estimation about at least one future location of the UE;

estimate radio condition at said at least one future location; determine, based on the estimated radio condition at said at least one future location, a time for transmitting the activation message;

and transmit the activation message at said time.

12. A method for a user equipment, UE, of a wireless communication system, the method comprising:

detecting an imbalance in a line-of-sight, LOS, training dataset for training a LOS detector;

determining a minority class of the LOS training dataset associated with the detected imbalance; transmitting, to a network element of the wireless communication system, a request message indicating the determined minority class and requesting measurement activation to perform one or more measurements, by the UE, to obtain one or more additional signal samples for the minority class; and receiving, from the network element, an activation message causing the UE to perform the one or more measurements during a configured observation window, wherein the method further comprises:

obtaining the one or more additional signal samples for the minority class; and after obtaining the one or more additional signal samples, retraining the LOS detector with the LOS training set, wherein the activation message comprises observation window configuration information, wherein the observation window configuration information indicates a duration of the observation window and a start time of the observation window relative to an index of a subframe carrying a predetermined message or relative to a system frame number, wherein the predetermined message is the request message and the subframe is an uplink subframe, or the predetermined message is the activation message and the subframe is a downlink subframe.

\* \* \* \* \*